United States Patent
Giller et al.

(10) Patent No.: US 12,455,402 B2
(45) Date of Patent: Oct. 28, 2025

(54) IMPLANTING PHOTONIC CRYSTALS INTO POLYMERS

(71) Applicant: The MITRE Corporation, McLean, VA (US)

(72) Inventors: Carl Giller, Arlington, VA (US); Robert Latham, Springfield, VA (US)

(73) Assignee: The MITRE Corporation, McLean, VA (US)

( * ) Notice: Subject to any disclaimer, the term of this patent is extended or adjusted under 35 U.S.C. 154(b) by 596 days.

(21) Appl. No.: 17/726,261

(22) Filed: Apr. 21, 2022

(65) Prior Publication Data
US 2023/0341587 A1 Oct. 26, 2023

(51) Int. Cl.
*G02B 1/00* (2006.01)
*G02B 1/04* (2006.01)

(52) U.S. Cl.
CPC ............ *G02B 1/005* (2013.01); *G02B 1/04* (2013.01)

(58) Field of Classification Search
CPC ................................ G02B 1/005; G02B 1/04
USPC ........................................................ 359/290
See application file for complete search history.

(56) References Cited

U.S. PATENT DOCUMENTS

| | | | |
|---|---|---|---|
| 7,077,984 B1 | 7/2006 | Natarajan et al. | |
| 9,306,218 B2 | 4/2016 | Pyun et al. | |
| 9,567,439 B1 | 2/2017 | Pyun et al. | |
| 9,933,567 B2 | 4/2018 | Park et al. | |
| 10,254,499 B1 * | 4/2019 | Cohen | B29C 64/321 |
| 2007/0087197 A1 * | 4/2007 | Jang | C09K 11/883 428/403 |
| 2008/0078678 A1 * | 4/2008 | Fujimoto | C03C 17/38 205/92 |
| 2010/0224823 A1 * | 9/2010 | Yin | C09C 1/24 252/62.56 |
| 2014/0106468 A1 * | 4/2014 | Boersma | G02B 6/1225 422/69 |
| 2017/0045732 A1 * | 2/2017 | Chang | G02B 5/0294 |
| 2019/0331847 A1 | 10/2019 | Ung | |
| 2021/0102012 A1 | 4/2021 | Pyun et al. | |
| 2022/0113257 A1 * | 4/2022 | Waldern | G01N 21/658 |

OTHER PUBLICATIONS

Oliver, K. et al., "Morphing in nature and beyond: a review of natural and synthetic shape-changing materials and mechanisms," J Mater Sci (2016) 51, pp. 10663-10689.

* cited by examiner

*Primary Examiner* — Mohammed A Hasan
(74) *Attorney, Agent, or Firm* — Sterne, Kessler, Goldstein & Fox P.L.L.C.

(57) ABSTRACT

Disclosed herein are embodiments of photonic crystals implanted into polymers to create durable, flexible structures that can respond to a series of external stimuli for sensing applications. Also disclosed are method embodiments of fabricating such photonic crystals.

20 Claims, 9 Drawing Sheets

IMPLANTING PHOTONIC CRYSTALS INTO POLYMERS

TECHNICAL FIELD

The present disclosure relates to a photonic crystal manufacturing technique, and more particularly, to a photonic crystal structure made of nanoparticles embedded into an elastomer with a solvent and a method of fabricating the same.

BACKGROUND

Photonic crystals are known structures designed to form an energy band structure for photons. A photonic crystal is a combination of materials having a photonic band gap where the electromagnetic wave of a specific wavelength band is not transmitted because the refractive index of a material is periodically changed. This can be used in various photoelectric devices, such as an optical filter, micro-laser, an electroluminescent device, a photovoltaic device, an optical switch, or a sensor.

Photonic crystals use arrays of reflectors where the lattice spacings of the reflectors determine reflection and transmission spectra based on a band gap analysis.

Photonic crystals may be grown on glass and other surfaces or implanted in hydrogels and other materials. However, hydrogels are not as durable for operational use as polymers or other materials. A hydrogel cannot maintain sensors outside of an aqueous solution as they require high concentrations of moisture to maintain their structural integrity and thus their spectral properties.

SUMMARY

Provided herein are various embodiments of a photonic crystal implanted into polymers creating a durable, flexible structure.

Also provided herein are various method embodiments of fabricating a photonic crystal implanted into polymers having the below-stated advantages.

Accordingly, a photonic crystal made from nanoparticles and embedded into an elastomer using a solvent that is compatible with silicone chemistries, does not bead up on a surface and which possesses a reasonably low boiling point, is described. This new process of fabrication enables more durable photonic crystals that may be used for a variety of sensing applications and may not require a power source. Furthermore, some of the embodiments described herein are designed to use wave interference to strengthen a range of reflected wavelengths. The wavelengths that are strengthened the most may be a design parameter of the photonic crystal and may change when perturbed by a magnetic field if the base elastomer into which the photonic crystal is embedded is made magnetic or via other physical stresses. Additional aspects will be set forth in part in the description which follows and, in part, will be apparent from the description, or may be learned by practice of the presented embodiments.

At least some of the embodiments are directed to depositing a plurality of nanoparticles on a surface, wherein the nanoparticles are suspended in a carefully chosen solvent; partially drying the plurality of nanoparticles and solvent, resulting in a plurality of photonic crystals; dispensing an elastomer mix onto the plurality of photonic crystals resulting in a plurality of hybrid photonic crystals; curing the plurality of hybrid photonic crystals; and obtaining diffraction spectra of the plurality of hybrid photonic crystals with or without the present of magnetic and/or mechanical stimuli present.

In at least some of the embodiments, a swelling ratio of the solvent is chosen to match the elastomer used.

In at least some of the embodiments, the boiling point of the solvent is chosen to optimize the photonic crystal drying time.

In at least some of the embodiments, the elastomer mix comprises a magnetorheological elastomer.

In at least some of the embodiments, magnets are placed near the plurality of hybrid photonic crystals during the curing step to align magnetic particles in the magnetorheological elastomer to improve magnetic sensitivity.

In at least some of the embodiments, the plurality of hybrid photonic crystals are magnetic sensors.

In at least some of the embodiments, the plurality of hybrid photonic crystals is mechanical sensors.

In at least some of the embodiments, the plurality of nanoparticles are coated with silica or other encapsulating material.

In at least some of the embodiments, the plurality of nanoparticles are reflective beads.

In at least some of the embodiments, the surface is non-stick.

In at least some of the embodiments, the plurality of nanoparticles are embedded in the solvent during the drying step.

According to another aspect of some of the embodiments, a plurality of nanoparticles are suspended in a solvent on a surface resulting in a plurality of photonic crystals; and an elastomer mixture encapsulating the plurality of photonic crystals resulting in the plurality of hybrid photonic crystals.

In at least some of the embodiments, a swelling ratio of the solvent matches the elastomer.

In at least some of the embodiments, the boiling point of the solvent is optimized for the drying of the photonic crystal.

In at least some of the embodiments, the elastomer mixture comprises a magnetorheological elastomer.

In at least some of the embodiments, magnets are placed near the plurality of hybrid photonic crystals to align magnetic particles in the magnetorheological elastomer during curing during the curing step to align magnetic particles into anisotropic structures within the magnetorheological elastomer.

In at least some of the embodiments, the plurality of hybrid photonic crystals are magnetic sensors.

In at least some of the embodiments, the plurality of hybrid photonic crystals are mechanical sensors.

In at least some of the embodiments, the plurality of nanoparticles are coated with silica or other encapsulating material.

In at least some of the embodiments, the plurality of nanoparticles are reflective beads.

Other aspects and features of the present disclosure will become apparent to those ordinarily skilled in the art upon review of the following description of specific embodiments in conjunction with the accompanying figures.

BRIEF DESCRIPTION OF THE DRAWINGS

The foregoing and other objects, features, and advantages of this disclosure will be apparent from the following detailed description taken in conjunction with the accompanying drawings.

In the following description, the same or similar elements are labeled with the same or similar reference numbers.

DETAILED DESCRIPTION

The present embodiments will now be described more fully hereinafter with reference to the accompanying drawings, in which embodiments of the disclosure are shown. The embodiments may, however, be embodied in many different forms and should not be construed as limited to the embodiments set forth herein. Rather, these embodiments are provided so that this disclosure will be thorough and complete, and will fully convey the scope of the disclosure to those skilled in the art.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Various embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
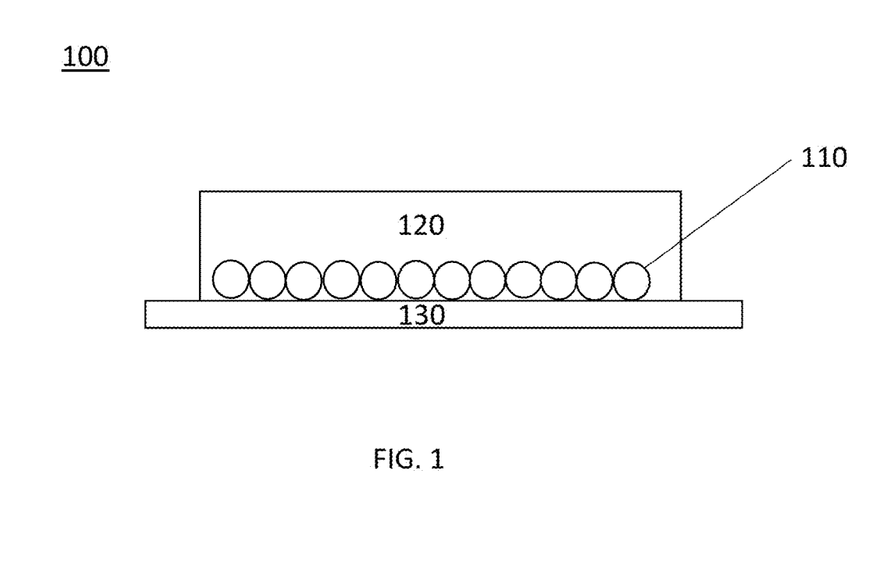
FIG. 1 is a cross-sectional view of a photonic crystal structure in a polymer structure layer, according to certain embodiments.

FIG. 1 is a cross-sectional view of a photonic crystal structure in a polymer structure layer, according to an embodiment.

Referring to FIG. 1, a plurality of nanoparticles 110 are suspended in a solvent 120 on a surface 130, which results in a hybrid photonic crystal. The surface 130 may be, for example, a petri dish coated with Teflon. The surface may be a flat, "non-stick" surface. A plurality of different solvents 120 were considered. The details of the solvent 120 may be seen in Table 1.

Table 1 shows the various solvents that were considered, including their boiling points and respective swelling ratios for a silicone elastomer. However, the solvents that can be used are not limited to those shown in Table 1, which are provided solely for illustrative purposes. In some embodiments, the most desirable solvent 120 is triethylamine, which has a swelling ratio of 1.58 with, for example, a silicone elastomer, and a boiling point of 89° C.

TABLE 1

| Solvent | Boiling Point (° C.) | Swelling Ratio |
| --- | --- | --- |
| Triethylamine | 89 | 1.58 |
| Tetrahydrofuran | 66 | 1.38 |
| 1,2-Dimethoxyethane | 85 | 1.32 |
| 2-Butanone | 80 | 1.21 |
| 1-Propanol | 97 | 1.09 |
| Ethanol | 78 | 1.04 |
| Water | 100 | 1.00 |

In some embodiments, the solvent 120 should have a reasonably low boiling point so that the photonic crystal formation is expeditious. The solvent 120 should also have a high swelling ratio for the uncured polymer matrix into which the nanoparticle-based photonic crystal is embedded. The swelling ratio may be used as a metric of how favorably the polymer chain interacts with the solvent containing the nanoparticles. In some embodiments, the nanoparticles may be suspended in a solvent with a sufficient swelling ratio and that is compatible with silicone chemistries. A higher swelling ratio of the solvent may also be desirable as this will indicate more favorable interactions of the solvent suspension with those chemistries.

The choice of solvent 120 should be carefully considered. The solvent 120 can assist in suspending the nanoparticles 110, adequately to form a coherent photonic crystal of high integrity on the hydrophobic surface 130 after mostly drying and be able to adequately interact with the uncured polymer chains within the polymeric matrix which may or may not contain any of a variety of magnetic powders to facilitate the interdiffusion of a preserved photonic crystal and the uncured polymeric matrix with each other.

Figure 2:
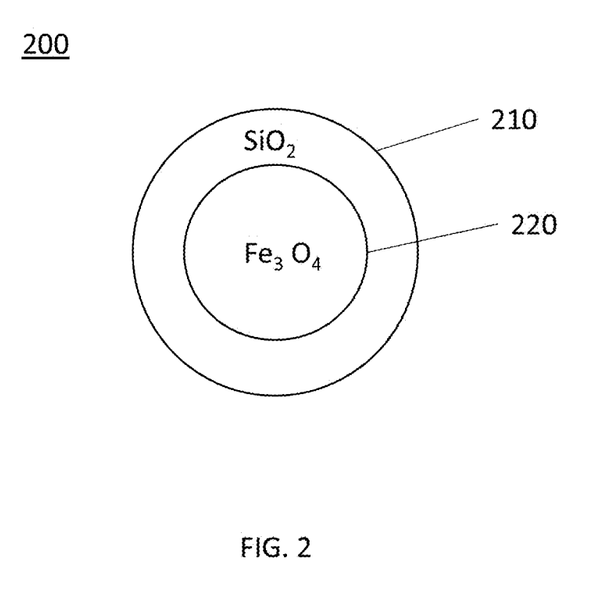
FIG. 2 depicts a view of one of a plurality of nanoparticles, according to certain embodiments.

In some embodiments, the plurality of nanoparticles 110 may be nanometer sized silica coated magnetite particles that can be suspended in the solvent 120 and is further described in FIG. 2. Additionally, the plurality of nanoparticles 110 may be crystal spheres adjacent to one another whose spectral properties are influenced by multiple reflections. The crystal spheres may be also reflective beads.

FIG. 2 depicts one nanoparticle 200 of the plurality of nanoparticles 110. The nanoparticle 200 can comprise two separate materials: an iron oxide 220 such as magnetite ($Fe_3O_4$) which may be coated with silica ($SiO_2$) 210. In various embodiments, the nanoparticle 200 may have a diameter chosen carefully to match the desired spectrum. The nanoparticle 200 further possesses a well-defined diffraction spectrum and has the capability of being suspended in a variety of solvents 120. It should be noted, materials other than magnetite 220 may be used. A magnetic material is not required for some embodiments.

In some embodiments, the self-assembly of the silica 210 and magnetite 220 allows for correct geometrical spacings by reaching the lowest energy state of electrostatic interactions.

If the nanoparticle 200 is suspended in a solvent such as water, for example, it may no longer be compatible with any number of polymer (including silicone) chemistries. But, if the nanoparticle 200 is suspended in other solvents, such as triethylamine, the nanoparticles will not bead up, but spread out to form a high integrity photonic crystal. A reasonably low boiling point may also be desirable such that the photonic crystal formation is expeditious. It should be noted that if the nanoparticle 200 is suspended in water as discussed, it may be later incompatible with certain elastomers. Therefore, in some embodiments, the nanoparticle is suspended in a solvent 120, such as triethylamine, as previously discussed.

Figure 3:
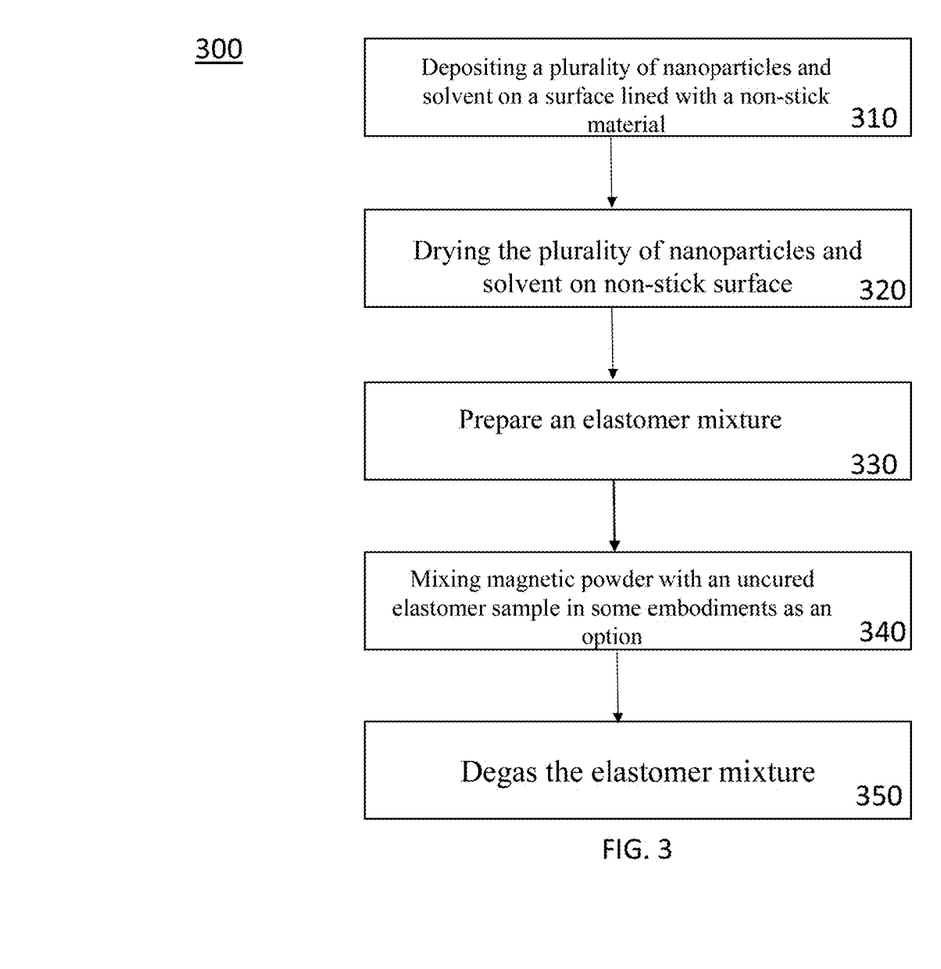
FIG. 3 describes a flowchart showing a method of fabricating a photonic crystal structure, according to certain embodiments.

FIG. 3 is a flowchart showing a method 300 of fabricating a photonic crystal structure according to an embodiment of the present disclosure.

In step 310, a plurality of nanoparticles, which can be reflective, are deposited on a non-stick surface, such as a petri dish lined with Teflon, and the nanoparticles are suspended in a solvent, such as triethylamine. The nanoparticles self-assemble to form a photonic crystal, but the photonic crystal structure itself does not change, except for the structure expanding and/or contracting in the presence of stimuli.

Step 320 includes drying the plurality of nanoparticles and solvent, which results in a plurality of photonic crystals. The length of drying, which results in partial evaporation of the solvent, depends on the amount of suspension deposited, as well as the area that is covered on the surface.

By partial drying, the correct amount of solvent is preserved in the photonic crystal, which enables interdiffusion of the photonic crystal and the polymer with each other. This interdiffusion results in the stable embedment of the photonic crystal within a polymer substrate.

Step 330 includes preparing an elastomer mix onto the plurality of photonic crystals, which results in a plurality of hybrid photonic crystals. It should be noted, the elastomer mix has a separate fabrication step, which is described in FIG. 4.

Figure 4:
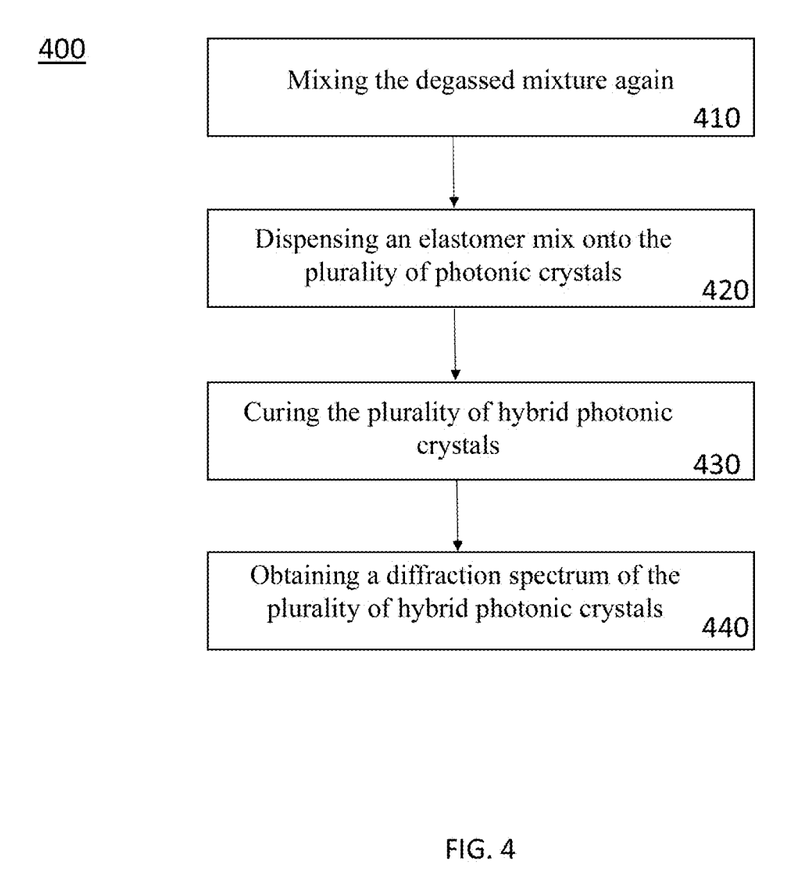
FIG. 4 describes a flowchart showing a method of fabricating a photonic crystal structure, according to certain embodiments.

If the plurality of photonic crystals are moderately or substantially wet after the drying step 320, then the presence of the solvent is still high. The force of pouring the uncured polymer on a wet suspension on the hydrophobic surface can disrupt the integrity of the photonic crystal, which is undesirable. Therefore, the drying step 320 should be completed before proceeding to the dispensing step, step 420.

The elastomer mixture of step 330 may comprise a magnetorheological elastomer (MRE), which is a type of soft magnetically-active rubber-like material, whose physical or mechanical properties can be altered upon the application of a magnetic field. In general, MREs can be prepared by mixing micron-sized magnetic particles into nonmagnetic rubber-like matrices. MREs are useful as they have a higher achievable strain (>>0.2%) than other developed magnetostrictive materials (such as Terfenol-D and Galfenol), as well as stiffness tunability and resilience. MREs are also easily processable and moldable.

MREs can contain anisotropically dispersed magnetic particles, meaning that the magnetic particles are aligned into higher order structures. Depending on the level of anisotropy, this can result in magnetic particle structures with varying levels of responsivity to magnetic fields of various types. To ensure that the magnetic particles are aligned, an additional fabrication step must be performed. This includes placing strong, rare-earth magnets (such as neodymium) on both sides of the surface 130 before the curing step 430, which will be described in FIG. 5. Placing the magnets on both sides of the surface 130 ensures that the material being cured experiences as much of the magnetic field as possible for maximum alignment of the magnetic particles present within. This alignment is further described in FIG. 5.

By coupling a photonic crystal with an MRE, mechanical forces imparted on the MRE by magnetic stimuli and are transferred to the photonic crystal, which results in a perturbation of the spectral response of the photonic crystal.

The strength of the applied magnetic field can be varied. The size and number of magnets can be adjusted or via non-magnetic spacers (such as cardboard) may be added between the magnets and the surface 130.

In step 430, the plurality of photonic crystals are thermally cured at specific times and temperatures (desirably above 80° C.), depending on the desired mechanical properties of the hybrid photonic crystal. During the curing step, the photonic crystal may be permanently physically coupled to the elastomer, essentially locking the photonic crystal in place in the polymer matrix. The magnetic polymer and photonic crystal assembly may be cured on a nonmagnetic hot plate. For MREs that contain anisotropically dispersed magnetic particles, additional measures should be taken during the curing process.

For example, the additional measures could include improving polymer and thereby sensor sensitivity. The ratio of prepolymer to curing agent may be increased to allow for an increase in both the flexibility of the polymer and thereby sensor sensitivity. However, if the ratio is above 30:1 (prepolymer:curing agent), the polymer may not fully cure and the resulting hybrid photonic crystal would be ineffective and unstable. By increasing the percentage of the magnetic powder relative to the base elastomer (the recipe for which consists both of the prepolymer and curing agent), the magnetic sensitivity will increase. However, above approximately 30% loading of the magnetic powder relative to the base elastomer, a reduction in the flexibility and sensitivity of the polymer will occur.

The resulting photonic crystal hybrid structure may be taken off the hot plate and out of the petri dish, which was used as the surface on which the hybrid photonic crystal was formed. Silicone oil may be applied between the magnetic photonic crystal hybrid structure and the non-stick surface to facilitate delamination of the magnetic or non-magnetic photonic crystal hybrid structure from the non-stick surface. After delamination, the photonic crystal is durable and ready for use.

In step 440, diffraction spectra of the plurality of hybrid photonic crystals may be obtained using any number of well-known techniques or equipment. These testing techniques are further described in FIGS. 7-10.

FIG. 4 shows a fabrication step 400 of the elastomer mixture to be used in the photonic crystal, according to some embodiments. For magnetic sensing applications, in step 340 magnetic powder is mixed into an uncured polymer sample, such as an uncured silicone elastomer, resulting in a mixture.

In step 350, the mixture is degassed in a vacuum oven. By degassing the mixture, bubble formation is minimized. The minimization of bubble formation will better ensure the operational integrity of the photonic crystal hybrid structure.

In step 310, a surface, such as a petri dish, is lined with a thin layer of a non-stick material, such as Teflon. This will allow for easier delamination of the hybrid photonic crystal after the fabrication is complete.

In step 410, the degassed mixture is carefully mixed again. This second mixing ensures that the mixture is as homogenous as possible so that consistent properties are achieved throughout the material.

Figure 5:
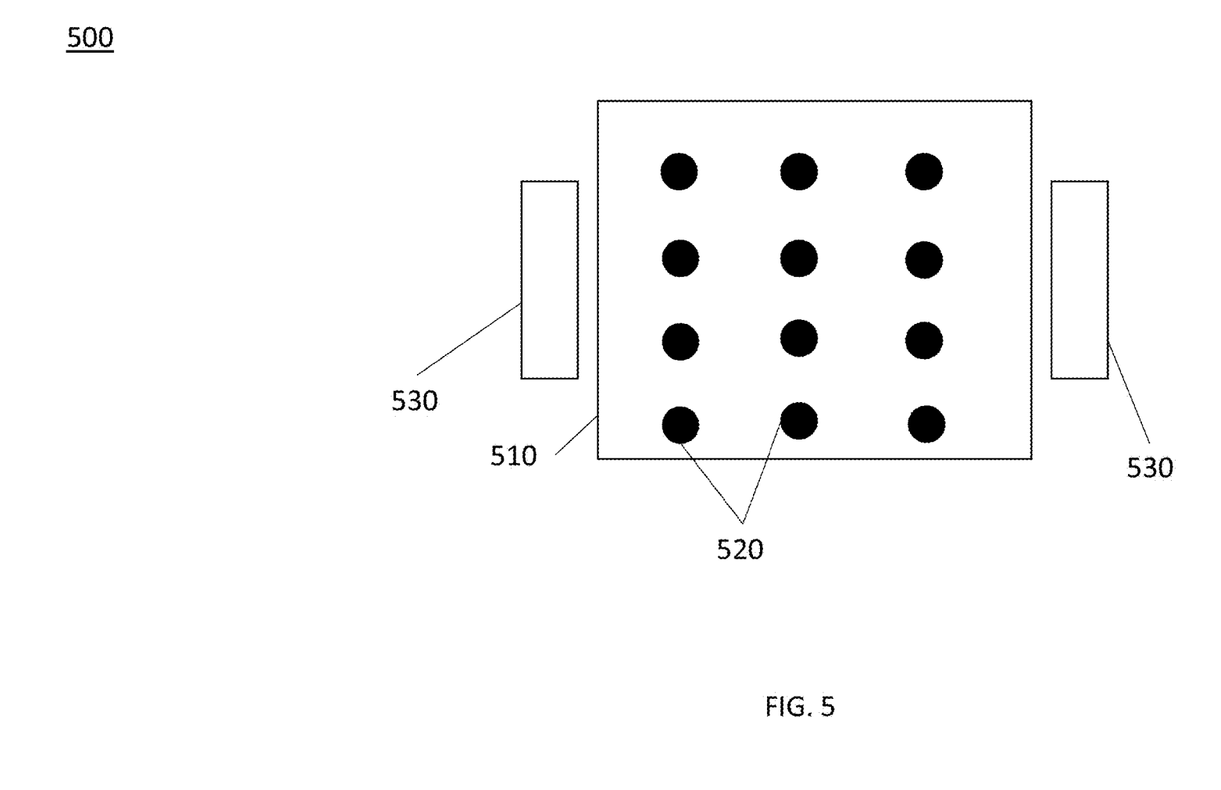
FIG. 5 is an overview of particles during alignment in a magnetic field, according to certain embodiments.

FIG. 5 depicts a setup 500 of particles aligned in a magnetic field using magnets. Magnetic particles 520 are shown within elastomer 510.

In some of the embodiments, to account for the sensitivity to magnetic fields, fabrication may have at least two requirements. First, strong rare-earth magnets 530 (such as neodymium) should be placed and aligned on both sides of the surface, or the petri dish, containing the uncured MRE/photonic crystal assembly to ensure that the sample under cure experiences as much of the magnetic field as possible. This facilitates the alignment of the magnetic particles mixed within the elastomer. Second, the strength of the magnetic field can be varied via the size and number of magnets used. The existence of neutral, non-magnetic spacers (such as cardboard) between the magnets and petri dish (or surface) may be useful as well to tune the magnetic field strength that the material under cure experiences.

The resulting fabricated photonic crystals may have a strong iridescence at certain wavelengths. The photonic crystals reinforce the reflection of one or more wavelengths depending on the spacing of the spheres in the crystals. The spacings can be influenced by magnetic fields of various types and strengths.

Even using different solvents, as described in Table 1, the resulting photonic crystals displayed iridescence peaks with harmonics of a fundamental. The spectral iridescent peaks are related to the periodic photonic bandgaps, which can be approximated with Bragg-like equations.

Moreover, the resulting fabricated hybrid photonic crystal structures can be used as a magnetic sensor. Magnetic sensors generally require sources of electricity to operate. Most magnetic sensors cannot be read remotely unless the measurement is conveyed by some type of radio transmitter or wired network. However, by utilizing an MRE, the magnetic sensor can read without supplied power. Additionally, a non-magnetic sensor can be utilized. Finally, the spectra of the resulting fabricated photonic crystal structures in the present embodiments are consistent and durable.

Figure 6:
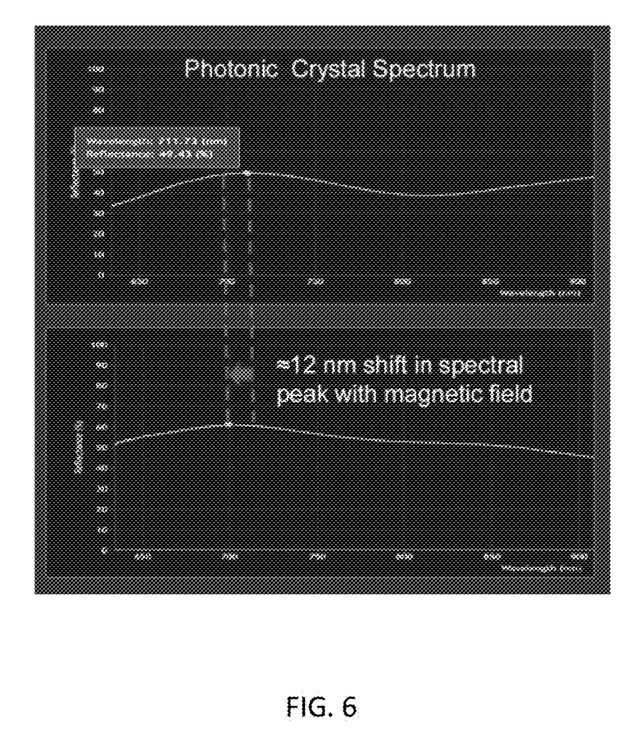
FIG. 6 depicts the diffraction patterns obtained from testing an example photonic crystal in the absence and presence of a magnetic field according to certain embodiments.

FIG. 6 describes testing one embodiment of the hybrid photonic crystal that senses magnetic fields. A 12 nm spectral shift is demonstrated. The applied magnetic field strength was approximately 0.5 Tesla. The applied strength shifted the fundamental wavelength by 48 nm/T.

Further testing of the photonic crystals of some of the embodiments of the present disclosure are also described. Mechanical and compressive forces can also be measured as depicted in FIGS. 7-8.

Figure 7:
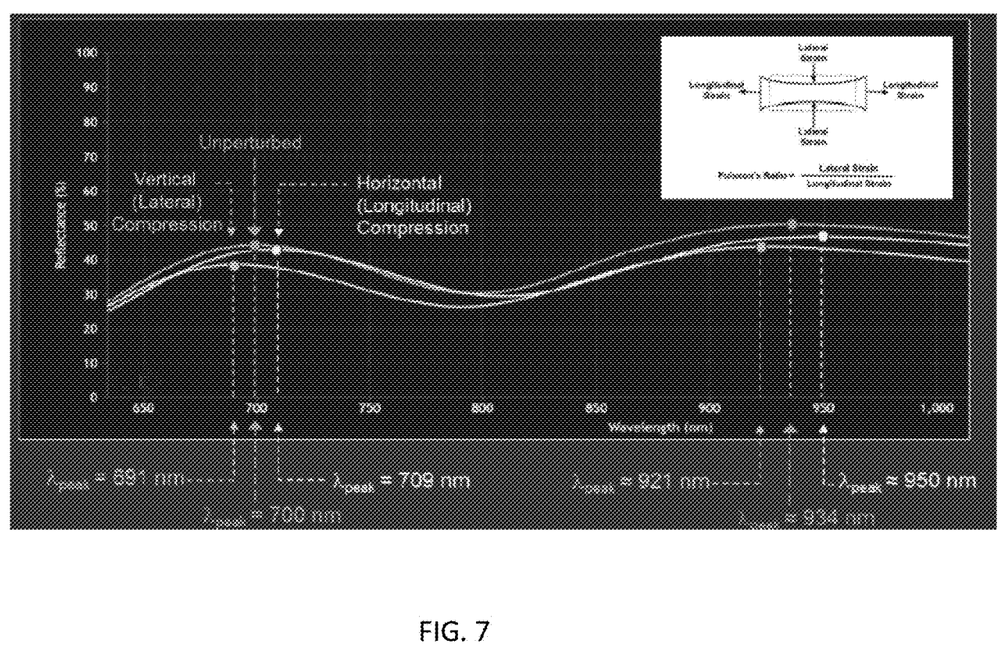
FIG. 7 depicts an example block compression test of the photonic crystal according to certain embodiments.

FIG. 7 describes a block compression test of the photonic crystal. A photonic crystal that senses mechanical compression has predictable wavelength shifts. The spectral peaks, depicted in FIG. 7, follow harmonic behavior. The bead spacings of the photonic crystal changed by 17 nm and the second harmonic wavelength peak changed by 13 nm for compressions equal to 2N.

Figure 8:
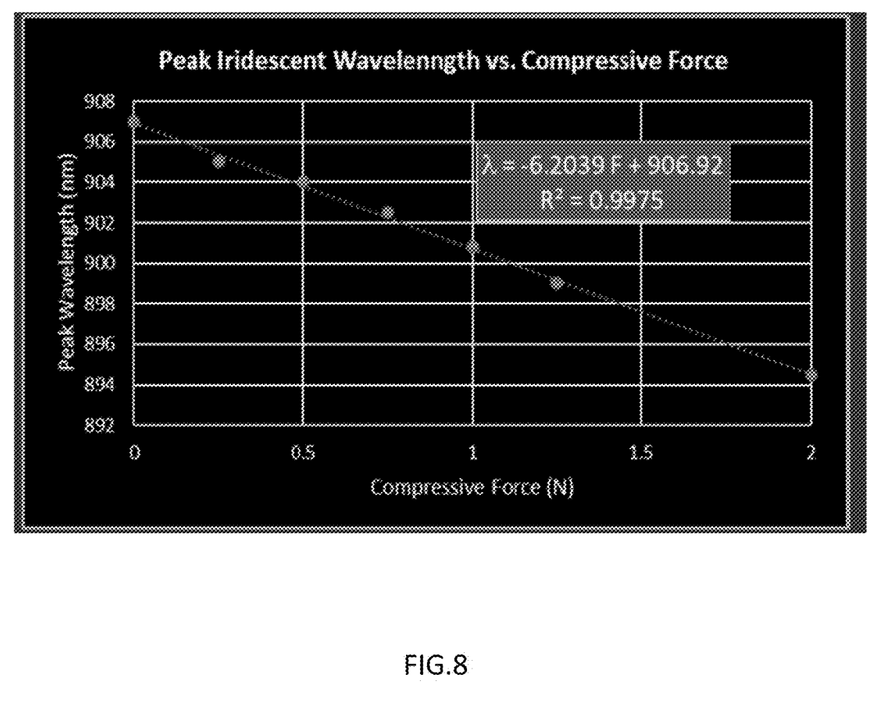
FIG. 8 illustrates the mathematical relationship between the peak iridescent wavelengths of the hybrid photonic crystal as a function of the compressive force that it experiences according to certain embodiments.

FIG. 8 describes the results of a block compression test of the photonic crystal using a force meter. A photonic crystal is compressed against the force meter and the compressive force is measured. As shown in FIG. 8, the peak spectral reflection wavelength change versus compressive force is linear.

Figure 9:
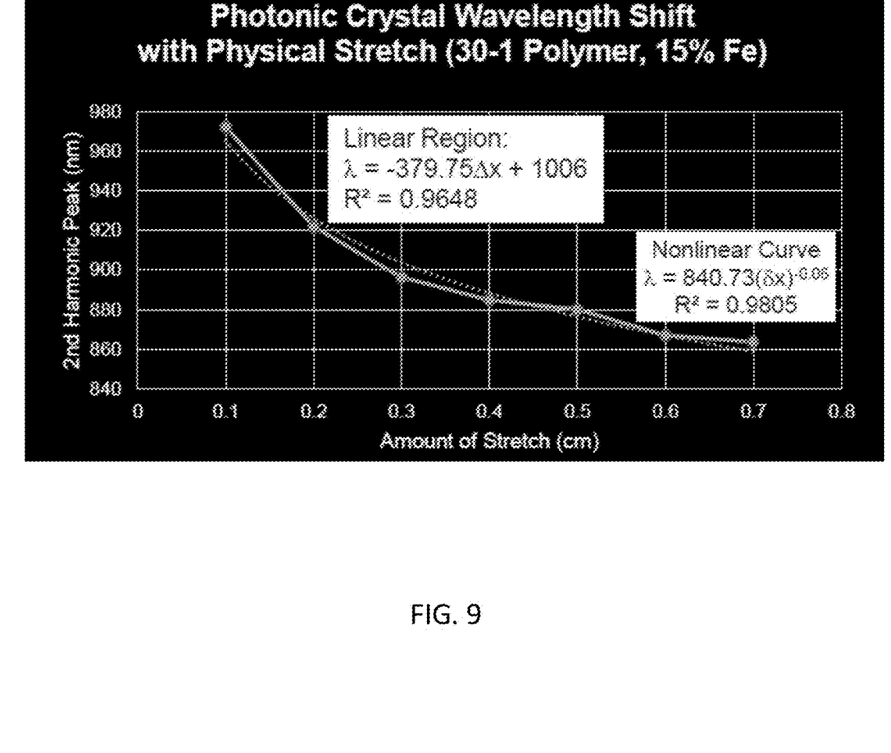
FIG. 9 illustrates the mathematical relationship between the photonic crystal wavelength shift of the hybrid photonic crystal as a function of the tensile force that it experiences according to certain embodiments.

FIG. 9 describes a tensile test of the photonic crystal hybrid structure. The stretching behavior of the photonic crystal can be tested. The photonic crystal hybrid structure peak spectral reflection wavelength shift demonstrates that the photonic crystal hybrid structures can sense mechanical expansion. Furthermore, the peak spectral reflection wavelength shifts are predictable.

The photonic crystal hybrid structures may also be tested with either AC or DC magnetic fields using an electromagnet. When the photonic crystal hybrid structures are in the presence of DC or AC magnetic fields, a peak spectral reflection wavelength shift is created by the expansion of the photonic crystal lattice structure and also by angular changes in reflection. The test frequency response can also be affected by the electromagnet having a high inductance. This reduces the high frequency output beyond a few kHz so careful measurement of frequency response is necessary. DC magnetic fields demonstrated a peak spectral reflection wavelength shift of approximately 0.06 nm/Gauss in one example embodiment.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method, comprising:
    depositing a plurality of nanoparticles on a surface, wherein the nanoparticles are suspended in a predetermined solvent;
    drying the nanoparticles and the solvent, resulting in a plurality of photonic crystals;
    dispensing an elastomer mix onto the photonic crystals resulting in a plurality of hybrid photonic crystals, wherein the elastomer mix comprises a magnetorheological elastomer;
    curing the hybrid photonic crystals, wherein the curing includes placing magnets near the plurality of hybrid photonic crystals to align magnetic particles in the magnetorheological elastomer to improve its magnetic sensitivity; and
    obtaining diffraction spectra of the hybrid photonic crystals.

2. The method of claim 1, wherein a swelling ratio of the solvent matches the elastomer.

3. The method of claim 1, wherein a boiling point of the solvent results in the drying of the photonic crystal.

4. The method of claim 1, wherein the hybrid photonic crystals are magnetic sensors.

5. The method of claim 1, further comprising coating the nanoparticles with silica ($SiO_2$) or other encapsulating material.

6. The method of claim 1, wherein the nanoparticles are reflective beads.

7. The method of claim 6, wherein the reflective beads are adjacent to one another causing multiple reflections.

8. The method of claim 1, wherein the surface is non-stick.

9. The method of claim 1, further comprising embedding the nanoparticles in the solvent during the drying.

10. A method for manufacturing a sensor, comprising:
    depositing a plurality of nanoparticles on a surface, wherein the nanoparticles are suspended in a predetermined solvent;
    drying the nanoparticles and the solvent, resulting in a plurality of photonic crystals;
    dispensing an elastomer mix onto the photonic crystals resulting in a plurality of hybrid photonic crystals;
    curing the hybrid photonic crystals, wherein the curing includes placing magnets near the plurality of hybrid photonic crystals to align magnetic particles in the elastomer mix to improve its magnetic sensitivity; and
    obtaining diffraction spectra of the hybrid photonic crystals.

11. The method of claim 10, wherein a swelling ratio of the solvent matches the elastomer.

12. The method of claim 10, wherein the elastomer mix comprises a magnetorheological elastomer.

13. The method of claim 10, wherein the hybrid photonic crystals are magnetic sensors.

14. The method of claim 10, further comprising coating the nanoparticles silica ($SiO2$) or other encapsulating material.

15. The method of claim 10, wherein the nanoparticles are reflective beads.

16. The method of claim 15, wherein the reflective beads are adjacent to one another causing multiple reflections.

17. The method of claim 10, wherein the surface is non-stick.

18. The method of claim 10, further comprising embedding the solvent during the drying.

19. A method for manufacturing a magnetic sensor, comprising:
    depositing a plurality of nanoparticles on a surface, wherein the nanoparticles are suspended in a predetermined solvent;
    drying the nanoparticles and the solvent, resulting in a plurality of photonic crystals;
    dispensing an elastomer mix onto the photonic crystals resulting in a plurality of hybrid photonic crystals;
    curing the hybrid photonic crystals, wherein the curing includes placing magnets near the plurality of hybrid photonic crystals to align magnetic particles in the elastomer mix to improve its magnetic sensitivity; and
    obtaining diffraction spectra of the hybrid photonic crystals.

20. The method of claim 19, wherein the elastomer mix comprises a magnetorheological elastomer.

* * * * *